(12) United States Patent
Terruzzi et al.

(10) Patent No.: US 10,598,881 B2
(45) Date of Patent: Mar. 24, 2020

(54) OPTICAL FIBRE WITH ENHANCED HIGH TEMPERATURE RESISTANCE

(71) Applicants: PRYSMIAN S.p.A., Milan (IT); POLITECNICO DI MILANO, Milan (IT)

(72) Inventors: Lidia Terruzzi, Milan (IT); Pamela De Martino, Milan (IT); Attilio Citterio, Milan (IT)

(73) Assignees: PRYSMIAN S.p.A, Milan (IT); POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/063,236

(22) PCT Filed: Dec. 16, 2015

(86) PCT No.: PCT/IB2015/059686
§ 371 (c)(1),
(2) Date: Jun. 15, 2018

(87) PCT Pub. No.: WO2017/103655
PCT Pub. Date: Jun. 22, 2017

(65) Prior Publication Data
US 2018/0372971 A1    Dec. 27, 2018

(51) Int. Cl.
| G02B 6/126 | (2006.01) |
| G02B 6/44 | (2006.01) |
| C08G 18/48 | (2006.01) |
| C08G 18/75 | (2006.01) |
| C09D 175/16 | (2006.01) |
| C03C 25/1065 | (2018.01) |
| C08G 18/24 | (2006.01) |
| C09D 4/00 | (2006.01) |
| C08F 290/06 | (2006.01) |
| G02B 6/02 | (2006.01) |
| C08G 18/67 | (2006.01) |
| C08K 5/07 | (2006.01) |
| C08K 5/5397 | (2006.01) |

(52) U.S. Cl.
CPC .......... G02B 6/443 (2013.01); C03C 25/1065 (2013.01); C08F 290/067 (2013.01); C08G 18/246 (2013.01); C08G 18/4854 (2013.01); C08G 18/672 (2013.01); C08G 18/758 (2013.01); C09D 4/00 (2013.01); C09D 175/16 (2013.01); G02B 6/02 (2013.01); G02B 6/02395 (2013.01); C08K 5/07 (2013.01); C08K 5/5397 (2013.01)

(58) Field of Classification Search
CPC ...... G02B 6/443; G02B 6/02; C08G 18/4854; C08G 18/758; C08G 18/672; C09D 175/16; C08K 5/07; C08K 5/5397
See application file for complete search history.

(56) References Cited

U.S. PATENT DOCUMENTS

| 4,274,709 A | 6/1981 | Asai |
| 6,438,306 B1 | 8/2002 | Bishop et al. |
| 2004/0048946 A1 | 3/2004 | Tortorello et al. |
| 2004/0077237 A1* | 4/2004 | Audenaert ........... C08G 18/025 442/82 |
| 2011/0201718 A1 | 8/2011 | Naitou et al. |
| 2014/0341521 A1 | 11/2014 | Fabian et al. |
| 2015/0353757 A1* | 12/2015 | Botelho .................. C09D 4/00 522/64 |
| 2016/0177092 A1* | 6/2016 | McCarthy .......... C08G 18/4825 522/162 |
| 2018/0163075 A1* | 6/2018 | Ren ...................... C09D 133/10 |

FOREIGN PATENT DOCUMENTS

| CN | 1379063 A | 11/2002 |
| CN | 1684919 A | 10/2005 |
| CN | 1257204 C | 5/2006 |
| CN | 102159538 A | 8/2011 |
| CN | 102471149 A | 5/2012 |
| EP | 1 232 196 B1 | 9/2005 |
| EP | 2 921 512 A1 | 9/2015 |
| KR | 101519099 * | 5/2015 |
| WO | 02/074849 A2 | 9/2002 |
| WO | 03/091177 A1 | 11/2003 |

OTHER PUBLICATIONS

Anonymous; "Crystallization of polymers", from Wikipedia, the free encyclopedia, URL:https://en.wikipedia.org/w/index.php?title=Crystallization_of_polymers&oldid=372195034, retrieved Oct. 8, 2015.
Chinese Office Action, dated Sep. 27, 2019, for Chinese Application No. 201580085741.7, 11 pages. (with English translation).

* cited by examiner

Primary Examiner — Ellen E Kim
(74) Attorney, Agent, or Firm — Seed IP Law Group LLP

(57) ABSTRACT

An optical fibre comprising: an optical waveguide comprising a core surrounded by a cladding; a primary coating surrounding the optical waveguide; and a coating, surrounding the primary coating, comprising a polymer material obtained by radiation curing a polymerizable composition, the polymer material having a degree of crystallinity of at most 12. The coating of the optical fiber according to the present invention exhibits enhanced resistance upon exposure to high temperature, preferably a temperature over 250° C., while endowed with required features such as protective capability, elasticity, adhesion to underlying layer and simple manufacturing.

20 Claims, No Drawings

OPTICAL FIBRE WITH ENHANCED HIGH TEMPERATURE RESISTANCE

FIELD OF THE INVENTION

The present invention relates to an optical fibre with enhanced high temperature resistance. More particularly, the present invention relates to an optical fibre comprising a coating made of a polymeric material based on a radiation curable composition comprising urethane acrylate oligomers.

BACKGROUND OF THE INVENTION

Optical fibres commonly comprises a glass core (typically with a diameter of about 120-130 μm), inside which the transmitted optical signal is confined, surrounded by a cladding, preferably made of glass. The combination of core and cladding is usually identified as "optical waveguide". The optical waveguide is generally protected by one or more outer coatings, typically of polymeric material. In the production of optical fibres, a polymeric coating is applied immediately after drawing of the optical waveguide for protection and reinforcement of the optical waveguide. Generally, two coatings are applied, a first soft coating layer (known as primary coating or inner primary coating) of a flexible polymer (low modulus, typically of from 1 MPa to 2 MPa at room temperature, and low Tg) which is provided directly on the glass surface, and a second coating layer (known as secondary coating or outer primary coating) of a more rigid polymer (higher modulus, typically of from 500 MPa to 2000 MPa at room temperature, and higher Tg) which is provided over the primary coating layer. The overall diameter of the optical waveguide and the primary and secondary coating can be of from 150 to 250 μm.

A buffer coating can be further provided over the primary coatings as protective layer in tight configuration, being applied in direct contact with the primary or, more frequently, the secondary coating. The buffer coating has a thickness such to bring the overall optical fibre diameter to a value of 600-1500 μm, and is generally made of a polymeric material, either thermoplastic or cured.

The individual fibres are generally combined in larger structures such as cables. Cables may comprise individual fibres or fibre ribbon structures. The optical fibre ribbon generally is made from 2, 4, 6, 8 or 12 optical fibres, in general arranged in a plane, and bonded together with a so-called matrix material. Several ribbons can be bundled (stacked) together using bundling materials.

Polymers that cure on exposure to radiation such as ultraviolet radiation are favoured in the industry, due to their fast cure, enabling the coated fibre to be produced at high speed. These radiation curable polymer compositions can make use of urethane oligomers having reactive terminal groups (such as acrylate or methacrylate groups) and a polymer backbone. Generally the compositions further comprise reactive diluents, photoinitiators and additives.

There are several properties which are commonly required for optical fibre coatings. Some of these requirements are: low water absorption, low extractables, maintenance of the desirable levels of properties such as modulus, elongation, Tg, and adhesion under aggressive aging conditions (over relatively long periods of time) including high temperatures and/or high humidities, immersion in water and chemical resistance.

The acrylate coatings for optical fibres known in the art are generally resistant up to 200° C. along the optical fibre lifespan. Applications requiring higher operating temperatures (over 200-250° C.) usually employ optical fibres with coatings other than acrylate, but these coatings entail manufacturing problems and/or cost increase.

Optical fibre coatings based on urethane acrylate oligomers are disclosed, for example, in US 2004/0048946. This document relates to a radiation-curable solvent-free coating composition which exhibits good yellowing resistance under aging conditions such as high temperature and/or high humidity (125° C./dry or 85° C./85% RH). In particular the radiation-curable solvent-free coating composition comprises:

(A) a radiation-curable urethane (meth)acrylate oligomer comprising an alkyd backbone,
(B) a reactive diluent,
(C) a photoinitiator, and optionally
(D) an additive.

The oligomer (A) is obtained by reacting an aromatic or aliphatic polyisocyanate, an hydroxy-terminated alkyd and a compound providing the reactive terminal groups, such as hydroxyalkylacrylate.

Reactive diluent (B) preferably has a molecular weight of not more than about 550. The reactive diluent system may comprise compounds such as: isobornylacrylate, laurylacrylate, 1,6-hexanediol-diacrylate, alkoxylated bisphenol A diacrylate. Isobornyl acrylate, ethoxylated bisphenol A diacrylate, and hexane diol diacrylate are particularly preferred.

The composite oligomer can be incorporated into outer primary coating.

U.S. Pat. No. 6,438,306 relates to a coated optical fibre comprising a cured coating having a relatively low yellowing. The compositions are designed for use as uncolored optical fibre secondary (or outer primary) coating. The radiation curable composition comprises:

(A) an oligomer,
(B) a reactive diluent, and
(C) a photoinitiator package of at least two free radical photoinitiators.

The oligomer (A) is a urethane acrylate oligomer derived from a polyol (e.g. a polyether diol obtained by ring-opening copolymerization of tetrahydrofuran) reacted with a an aromatic or aliphatic diisocyanate and hydroxyalkylacrylate (e.g. 2-hydroxy ethyl (meth)acrylate). The average molecular weight of the urethane acrylate is from about 1,200 to about 20,000.

The reactive diluents (B) are, e.g., polymerizable vinyl monomers, such as 1,6-hexanediol di(meth)acrylate and alkoxylated bisphenol A diacrylate.

WO 02/074849 relates to a liquid curable resin composition suitable as a coating material. In particular, curable resin composition suitable for a secondary coating material affected by heat and humidity to only a small degree can be obtained by using a urethane (meth)acrylate obtained using a specific diol as a diol component, specifically at least one diol component (A1) selected from the group consisting of polypropylene glycol with an average molecular weight of 300-5,000, a copolymer of propylene oxide and ethylene oxide with a number average molecular weight of 300-5,000 and a copolymer 15 of ethylene oxide and butylene oxide with a number average molecular weight of 300-5000.

In addition to diol (A1), other polyols (A2) may optionally be used. As examples of polyols used as the component (A2), polytetramethylene glycol is mentioned.

As examples of the diisocyanate 2,4-tolylene diisocyanate, isophorone diisocyanate, and methylenebis(4-cyclohexylisocyanate) are preferable.

As examples of the (meth)acrylate, 2-hydroxyethyl (meth)acrylate is particularly preferable. A polymerizable polyfunctional compound may be added to the liquid curable resin. As examples of polyfunctional compounds, 1,6-hexanediol di(meth)acrylate and, preferably, di(meth)acrylate of ethylene oxide addition product of bisphenol A, are used.

SUMMARY OF THE INVENTION

The acrylate coatings for optical fibres known in the art are generally resistant up to 200° C. along the optical fibre lifespan. Over a certain temperature, however, the acrylate coatings suffer from degradation and decomposition phenomena resulting in a weight loss of the coating. Weight loss over a certain extent may cause impairment of the coating mechanical properties and/or geometry, thus jeopardizing the protecting function of the coating.

The Applicant has thus faced the problem of providing an optical fibre having a coating with enhanced resistance upon exposure to high temperature, preferably a temperature over 250° C., while endowed with required features such as protective capability, elasticity, adhesion to underlying layer and simple manufacturing.

The Applicant has observed that such enhanced resistance upon exposure to high temperature is associated with a null or reduced weight loss at such temperature.

In particular, the Applicant has faced the problem of providing an optical fibre with a coating radially external to the primary coating, wherein the external coating exhibits a reduced weight loss at a temperature of 300° C. or higher.

The Applicant found that urethane acrylate based coatings having a high degree of cristallinity exhibit an unexpected reduction of weight loss when subjected to thermal aging compared to the coatings having a lower cristallinity degree.

In particular, the Applicant found that coating compositions comprising polyurethane acrylate substantially free from aromatic moieties are particularly suitable for providing coatings having a superior degree of cristallinity and enhanced temperature resistance. Without wishing to be bound to such theory, the Applicant hypothesized that the preponderance of aliphatic chains in the polyurethane acrylate could give place to a localized lattice (array of points repeating periodically in three dimensions) within the polymer chain and to provide a better tacticity than that of chains including aromatic moieties. The resulting degree of cristallinity or order degree surprisingly gives place to an improved resistance to temperature increases.

According to a first aspect, the present invention relates to an optical fibre comprising:
 an optical waveguide comprising a core surrounded by a cladding;
 a primary coating surrounding the optical waveguide; and
 a coating surrounding the primary coating and comprising
  a polymer material obtained by radiation curing a polymerizable composition, the polymer material having a degree of cristallinity of at most 12.

For the purpose of the present description and of the claims that follow, the degree of cristallinity of the polymer material is expressed as the Full Width at Half Maximum (FWHM) of the main intensity peak plotted against the 2theta (2θ) diffraction angle of its X-ray scattering pattern having a maximum within the range 10-30 2θ. The values of FWHM reported in the present description and claims are the values of FWHM measured width ($FWHM_{meas}$) corrected by the instrumental FWHM width ($FWHM_{instr}$) according to the following formula: $FWHM=(FWHM_{meas}^2-FWHM_{instr}^2)^{1/2}$.

The lower the degree of cristallinity value resulting from the above method is, the higher the cristallinity of the material is.

For the purpose of the present description and of the claims that follow, as "tacticity" is meant the orderliness of the succession of configurational repeating units in the main chain of a regular macromolecule, a regular oligomer molecule, a regular block, or a regular chain, according to the definition of IUPAC (Glossary Of Basic Terms In Polymer, Science, IUPAC Recommendations 1996, page 2292)

As known to the skilled one, polymer materials are made of polymeric chains. The cristallinity of the polymeric materials is proportional to the tacticity of the polymeric chains, i.e. to the capacity of the polymer chain to align one another to provide a suitable order degree.

Preferably the polymer material of the present invention has a degree of cristallinity of from 4 to 12, more preferably from 6 to 12.

In the optical fibre of the invention the coating surrounding the primary coating can be a secondary coating, a buffer coating or both. Preferably, the coating surrounding the primary coating is a secondary coating to provide the optical waveguide with a better mechanical resistance.

When the coating surrounding the primary coating is a secondary coating, the polymer material of the coating surrounding the primary coating comprises:
 (A) a radiation-curable urethane (meth)acrylate oligomer obtained by reacting an aliphatic polyisocyanate, a $C_{40}$-$C_{64}$ polyoxyalkylene ether glycol and a hydroxyl-containing (meth)acrylate monomer;
 (B) at least one reactive diacrylate monomer; and
 (C) at least one photoinitiator.

When the coating surrounding the primary coating is a buffer coating, the polymer material of the coating surrounding the primary coating comprises:
 (A) a radiation-curable urethane (meth)acrylate oligomer obtained by reacting an aliphatic polyisocyanate, a $C_{80}$-$C_{180}$ polyoxyalkylene ether glycol and a hydroxyl-containing (meth)acrylate monomer;
 (B) at least one reactive diacrylate monomer; and
 (C) at least one photoinitiator.

For the purpose of the present description and of the claims that follow, the expression "(meth)acrylate" means "acrylate" or "methacrylate".

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the claims that follow, except where otherwise indicated, the weight percentages (wt %) of each component that forms the polymerizable composition are expressed with respect to the weight of the polymerizable composition.

According to a second aspect, the present invention relates to a polymerizable composition comprising:
 (A) a radiation-curable urethane (meth)acrylate oligomer obtained by reacting a cycloaliphatic polyisocyanate, a $C_{40}$-$C_{180}$ polyoxyalkylene ether glycol and a hydroxyl-containing (meth)acrylate monomer;

(B) at least one reactive diacrylate monomer;
(C) at least one photoinitiator.

Preferably, the aliphatic polyisocyanate is a cycloaliphatic polyisocyanate.

The cycloaliphatic polyisocyanate can be selected from methylenebis(4-ciclohexyl)isocyanate, isophoronediisocyanate and mixture thereof.

When the coating surrounding the primary coating is a secondary coating, the $C_{40}$-$C_{64}$ polyoxyalkylene ether glycol is preferably a compound of general formula (Ia)

$$\text{HO}[[-\text{CH}_2]_n\text{O}-]_m\text{H} \quad \text{(Ia)}$$

wherein:
n is an integer selected from 2 to 6;
m is an integer selected from 7 to 32;
with the proviso that n multiplied by m is a value of from 40 to 64.

More preferably, the $C_{40}$-$C_{64}$ polyoxyalkylene ether glycol is a compound of general formula (Ia) wherein n=4 and m is from 10 to 16.

The number average molecular weight (measured by GPC analysis) of the polyoxyalkylene ether glycol used in the composition for the secondary coating is preferably equal to or greater than 650, more preferably up to 1,300.

When the coating surrounding the primary coating is a buffer coating, the $C_{80}$-$C_{180}$ polyoxyalkylene ether glycol is preferably a compound of general formula (Ib)

$$\text{HO}[[-\text{CH}_2]_n\text{O}-]_m\text{H} \quad \text{(Ib)}$$

wherein:
n is an integer selected from 2 to 6;
m is an integer selected from 20 to 45;
with the proviso that n multiplied by m is a value of from 80 to 180.

More preferably, the $C_{80}$-$C_{180}$ polyoxyalkylene ether glycol is a compound of general formula (I) wherein n=4 and m is from 25 to 45.

The number average molecular weight (measured by GPC analysis) of the polyoxyalkylene ether glycol used in the composition for the buffer coating is preferably equal to or greater than 1,400, more preferably up to 3,400.

Hydroxyl group-containing (meth)acrylate suitable for the material of the surrounding coating of the present invention include (meth)acrylates that can be obtained from (meth)acrylic acid and epoxy and (meth)acrylates comprising alkylene oxides.

The hydroxyl-containing (meth)acrylate monomer may be selected from: hydroxyalkyl(meth)acrylate monomer, hydroxyaryl(meth)acrylate monomer, hydroxycycloalkyl (meth)acrylate monomer and mixture thereof.

Preferably, the hydroxyl-containing (meth)acrylate monomer is an hydroxyalkyl(meth)acrylate monomer, more preferably an hydroxyl-($C_2$-$C_5$)alkyl-(meth)acrylate monomer. Preferred examples of hydroxyalkyl(meth)acrylate monomer which are suitable in the present invention are: 2-hydroxyethyl (meth)acrylate, 2-hydroxypropyl (meth)acrylate, 2-hydroxybutyl (meth)acrylate. Even more preferably, the hydroxyl-containing (meth)acrylate monomer is 2-hydroxyethyl (meth)acrylate.

Examples of hydroxyaryl(meth)acrylate monomer and hydroxycycloalkyl-(meth)acrylate monomer compounds which are suitable for use in the present invention include 2-hydroxy-3-phenyloxypropyl (meth)acrylate, 1,4-butanediol mono(meth)-acrylate, 2-hydroxyalkyl(meth)acryloyl phosphate, 4-hydroxycyclohexyl (meth)-acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth)acrylate, dipentaerythritol penta(meth)acrylate, The urethane oligomer (A) suitable in the present invention are either commercially available or they can be synthesized according to synthesis routes known in the art.

The ratio of polyoxyalkylene ether glycol, polyisocyanate and hydroxyl group-containing (meth)acrylate used for preparing the urethane (meth)acrylate is preferably determined so that about 1.1 to about 3 equivalents of an isocyanate group included in the polyisocyanate and about 1.1 to about 3 equivalents of a hydroxyl group included in the hydroxyl group-containing (meth)acrylate are used for one equivalent of the hydroxyl group included in the glycol.

In the reaction for the preparation of the oligomer (A), a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from about 0.01 to about 1 wt % of the total amount of the reactant. The reaction is preferably carried out at a temperature from about 10° C. to about 90° C., and preferably from about 30° C. to about 80° C.

When the coating surrounding the primary coating is a secondary coating, the number average molecular weight (measured by GPC analysis) of the urethane (meth)acrylate used in the composition of the present invention is preferably of from 1,200 to 2,000.

When the coating surrounding the primary coating is a buffer coating, the number average molecular weight (measured by GPC analysis) of the urethane (meth)acrylate used in the composition of the present invention is preferably of from 2,000 to 5,500.

Preferably, the urethane (meth)acrylate oligomer (A) is present in the polymerizable composition in an amount of from 20 wt % to 90 wt %, more preferably from 30 wt % to 70 wt %, based on the weight of said polymerizable composition.

The reactive diacrylate monomer (B) comprises two acrylate functional groups capable of polymerization when exposed to actinic radiation.

In a first preferred embodiment of the present invention, the reactive diacrylate monomer is a cycloaliphatic diacrylate monomer or a mixture of two or more cycloaliphatic diacrylate monomers. A particularly preferred cycloaliphatic diacrylate monomer is isopropylenedicyclohexil-4,4'-diacrylate.

In a second preferred embodiment, the reactive diacrylate monomer (B) is bisphenol A glycerolate di(meth)acrylate.

Preferably, the reactive diacrylate monomer (B) has a molecular weight greater than 200, more preferably a molecular weight of from 400 to 800.

Preferably, the reactive diacrylate monomer (B) is present in the polymerizable composition in an amount of from 20 wt % to 80 wt %, more preferably from 20 wt % to 75 wt %, based on the weight of said polymerizable composition.

In accordance with the present invention, the polymerizable composition comprises one or more photoinitiators (C) so that the polymerizable composition can be cured under exposure to electromagnetic radiation, particularly under UV radiation.

Conventional photoinitiators can be used in the present invention. Examples of suitable photoinitiators include benzophenone- and/or acetophenone derivatives, such as alpha-hydroxy alkylphenyl ketones, benzoin alkyl ethers and benzil ketals, monoacylphosphine oxides, and bisacylphosphine oxides. Preferred photoinitiators are 1-hydroxycyclohexyl phenyl ketone (Irgacure 184, Ciba Geigy), 2-hydroxy-2-methyl-1-phenyl-propan-1-one (Darocur 1173), and diphenyl(2,4,6-trimethylbenzoyl) phosphine oxide (Lucirin TPO).

Preferably, the photoinitiator (C) is present in the polymerizable composition in an amount of from 0.3 wt % to 8 wt %, more preferably from 1 wt % to 5 wt %, based on the weight of said polymerizable composition.

In accordance with the present invention, the polymerizable composition may optionally comprise at least one compound acting as viscosity adjuster. Preferably, the viscosity adjuster is an aliphatic or aromatic compound comprising at least an acrylate functional group.

Example of viscosity adjusters that can be used in the present invention are: hexamethylendiacrylate, isobornylacrylate, phenoxyethylacrylate, decylacrylate, laurylacrylate, stearylacrylate and ethoxyethoxyethylacrylate. More preferably, the viscosity adjuster is selected from: hexamethylendiacrylate, isobornylacrylate, phenossiethylacrilate, laurylacrylate and mixture thereof.

The viscosity adjuster can be added in an amount such that the viscosity of the polymerizable composition at room temperature is in the range of about 500 to about 20,000 mPa·s, preferably in the range of about 1,000 to about 10,000 mPa·s.

The viscosity adjuster can be present in the polymerizable composition in a total amount of from 1.0 wt % to 50 wt %, more preferably from 5 wt % to 30 wt %, based on the weight of said polymerizable composition.

The polymerizable composition of the present invention can also include other conventional additives in effective amounts. For example, additives such as stabilizers to prevent gelation, UV screening compounds, leveling agents, polymerization inhibitors, adhesion promoters, light stabilizers, chain transfer agents, colorants including pigments and dyes, plasticizers, fillers, wetting improvers, preservatives and the like can be used.

The polymerizable composition of the present invention can be prepared by mixing its components with any suitable method known in the art of polymer preparation such as internal mixers, twin screw extruders, kneaders, ribbon blenders and the like.

The manufacturing of the coated optical fibre according to the present invention can be carried out according to known techniques. For example, after drawing of the optical waveguide and application of the primary coating, a secondary coating and/or a buffer coating can be applied on the primary coating by passing the optical waveguide coated with the primary coating through a sizing die and a reservoir containing a polymerizable composition according to the present invention followed by radiation curing (by UV or IR) of the applied composition so as to obtain the final polymer material. In the case of deposition of both secondary coating and a buffer coating, the latter is applied on the secondary coating in a passing stage, before or after the radiation curing of the secondary coating (wet-on-dry or wet-on-wet deposition).

The polymerizable composition can be formulated so that after curing the degree of cristallinity is equal to or lower than 12, preferably from 4 to 12.

When the coating surrounding the primary coating is a secondary coating, the polymer material after curing preferably has an elastic modulus (E') at 100° C. of from 15 to 40 MPa, preferably of from 20 to 35 MPa.

When the coating surrounding the primary coating is a buffer coating, the polymer material after curing preferably has an elastic modulus (E') at 100° C. of from 1 to 40 MPa, preferably of from 5 to 35 MPa.

Preferably, after curing, the polymer material of the coating surrounding the primary coating has a Tg (measured by dynamic mechanical analysis using the Tan Delta Peak parameter) of from 40 to 110° C., preferably of from 50 to 100° C. MPa.

In accordance with the present invention, the primary coating can be made of the polymeric materials conventionally used for the manufacturing of primary protective coatings for optical fibres. Typically, the primary coating is made from radiation curable coating compositions comprising radiation curable oligomers which are compatible with the oligomers used in the secondary coating according to the present invention, but with different elastic modulus. Preferably, the elastic modulus of the primary coating at ambient temperature (25° C.) is within the range 0.1-5 MPa.

Preferably, the primary coating of the present invention is obtained from polymerizable composition comprising urethane acrylate oligomers. For instance, the radiation curable oligomers included in the primary coating may have a backbone derived from polypropylenglycol and a dimer acid based polyester polyol. Preferably, the oligomer is a urethane acrylate oligomer comprising said backbone, more preferably a fully aliphatic urethane acrylate oligomer.

Particularly preferred materials for the primary coating of the optical fibre of the invention are disclosed in WO 03/091177.

The present description shows only some embodiments of a coated optical fibre according to the invention. Suitable modifications can be made to these embodiments according to specific technical needs and application requirements without departing from the scope of the invention.

The following examples are provided to further illustrate the invention.

EXAMPLES

Urethane Acrylate Oligomer Synthesis

A urethane acrylate oligomer (Oligomer 1) for secondary coating according to the present invention was prepared by reacting 0.01 mol of $C_{14}$-polytetramethylene ether glycol (PTHF; average molecular weight: 1000) with 0.02 mol of 4,4'-methylenebis(cyclohexyl isocyanate) (HDMI; average molecular weight: 262) in the presence of dibutyl tin dilaurate as catalyst (0.02 wt % of the total weight of the reaction mixture). The reaction mixture was heated at 70° C. for 2 h. 0.02 mol of 2-hydroxyethyl acrylate (HEA) were then added to the reaction mixture. The resulting mixture was then heated at 70-80° C. for 4 h to complete the polymerization reaction. The structure of Oligomer 1 is given in Formula 1 below:

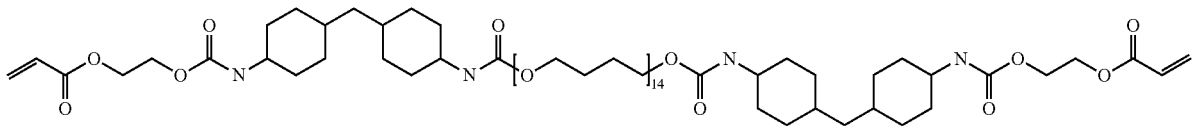

For comparative purposes Oligomer 2 was prepared as described for Oligomer 1 above using toluene 2,4-diisocyanate (TDI) instead of HDMI. The structure of Oligomer 2 obtained is given in Formula 2 below:

A urethane acrylate oligomer (Oligomer 3) for buffer coating according to

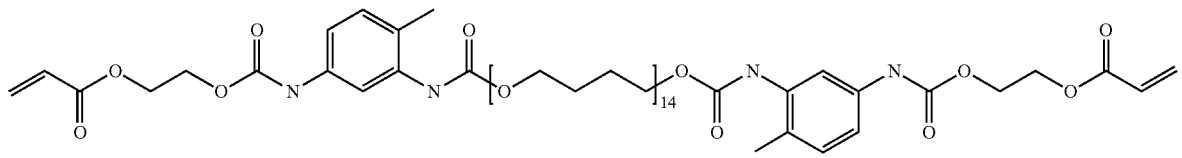

the present invention was prepared by reacting 0.01 mol of $C_{27}$-polytetramethylene ether glycol (PTHF; average molecular weight: 2000) with 0.02 mol of 4,4'-methylenebis (cyclohexyl isocyanate) (HDMI; average molecular weight: 262) in the presence of dibutyl tin dilaurate as catalyst (0.02 wt % of the total weight of the reaction mixture). The reaction mixture was heated at 70° C. for 2 h. 0.02 mol of 2-hydroxyethyl acrylate (HEA) were then added to the reaction mixture. The resulting mixture was then heated at 70-80° C. for 4 h to complete the polymerization reaction. The structure of Oligomer 3 is given in Formula 3 below:

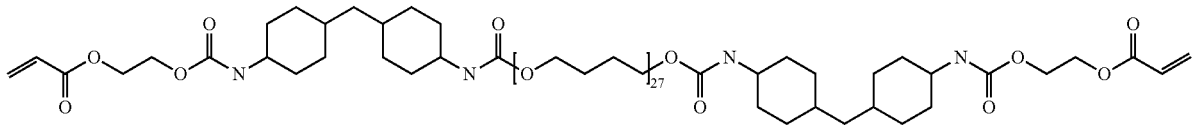

A urethane acrylate oligomer (Oligomer 4) for buffer coating according to the present invention was prepared by reacting 0.01 mol of $C_{40}$-polytetramethylene ether glycol (PTHF; average molecular weight: 2900) with 0.02 mol of 4,4'-methylenebis(cyclohexyl isocyanate) (HDMI; average molecular weight: 262) in the presence of dibutyl tin dilaurate as catalyst (0.02 wt % of the total weight of the reaction mixture). The reaction mixture was heated at 70° C. for 2 h. 0.02 mol of 2-hydroxyethyl acrylate (HEA) were then added to the reaction mixture. The resulting mixture was then heated at 70-80° C. for 4 h to complete the polymerization reaction. The structure of Oligomer 4 is given in Formula 4 below:

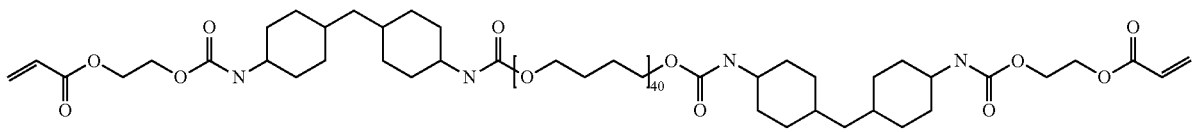

Formulation of the Polymerizable Compositions

The polymerizable compositions for secondary coatings (Table 1a) and buffer coating (Table 1b) were formulated by mixing the oligomer, the reactive diacrylate monomer, photoinitiators and other additives in the amount listed in Table 1 (amounts expressed as weight percentages with respect to the total weight of the formulation). The polymerizable compositions were formulated in a dark bottle heated at 70° C. under a stream of nitrogen and high-speed mixing.

TABLE 1a

| | Sample | | | | |
|---|---|---|---|---|---|
| | 2 | 3 | 4 | 5 | 1* |
| Oligomer 1 | 36.25 | 59.94 | 50.00 | 37.00 | |
| Oligomer 2 | | | | | 36.25 |
| BAGDA | | | 27.00 | 27.00 | 28.79 |
| IPCA | 28.79 | | | | |
| PEA | | | | | 18.13 |
| MEA | 18.13 | | 20.00 | 20.00 | |
| HDA | | 24.26 | | | |
| BA | 12.80 | 12.80 | | 13.00 | 12.80 |
| LA | 2.13 | | | | 2.13 |
| Lucirin TPO | 1.05 | 2.00 | 2.00 | 2.00 | 1.05 |
| IRG184 | 0.85 | 1.00 | 1.00 | 1.00 | 0.85 |

TABLE 1b

| | Sample | |
|---|---|---|
| | 6 | 7 |
| Oligomer 3 | 59.84 | |
| Oligomer 4 | | 66.92 |
| BAGDA | 21.68 | 17.88 |
| HDA | 16.09 | 13.26 |
| Lucirin TPO | 1.59 | 1.30 |
| IRG184 | 0.80 | 0.64 |

BAGDA: bisphenol A glycerolate diacrylate
IPCA: isopropylendicycloehexyl-4,4'-diacrylate;
PEA: phenoxyethylacrylate;
MEA: mentylacrylate;
HDA: hexamethylene diacrylate;
BA: isobornyl acrylate;
LA: lauryl acrylate;
Lucirin TPO: diphenyl(2,4,6-trimethylbenzoyl)phosphine oxide;
IRG184: 1-hydroxycyclohexyl phenyl ketone (Irgacure 184).

The sample with the asterisk is a comparative one.

Preparation of Samples and Tests.

Films of polymer material were prepared by depositing a layer of the polymerizable compositions on a glass plate. The compositions were cured using a D bulb UV lamp at dose of about 850 mJ/cm$^2$.

Elastic moduli (E') at 100° C. of the film samples were determined through DMTA analysis.

Tg and weight loss of each polymer material was determined through TGA analysis (temperature range 20-800° C.; temperature ramp 20° C./min). For each polymer material three to four main steps of weight loss were generally observed.

The results of the experimental tests are reported in Tables 2a and 2b. Where a value range is provided, this refers to measurements taken on different samples of the same composition.

TABLE 2a

| | Sample | | | | |
|---|---|---|---|---|---|
| Parameter | 2 | 3 | 4 | 5 | 1* |
| E' at 100° C. (MPa) | 14-30 | 18 | 25 | 26.8 | 12-20 |
| Tg (° C.) | 80-90 | 69.71 | 77.00 | 83.38 | 65.50 |
| TGA % weight loss[1] | | | | | |
| Step I | 2.4 (200) | 18.5 (320) | 3.9 (290) | 3.2 (290) | 3.0 (220) |
| Step II | 53.3 (320) | 79.0 (420) | 21.6 (380) | 25.0 (380) | 24.0 (300) |
| Step III | 42.9 (420) | — | — | — | 66.3 (420) |

[1]The temperature at which the weight loss occurred is indicated between parentheses (° C.).

TABLE 2b

| | Sample | | |
|---|---|---|---|
| Parameter | 6 | 7 | 8* |
| E' at 100° C. (MPa) | 33 | 6-10 | 13 |
| Tg (° C.) | 81.03 | 85-90 | 82.94 |
| TGA % weight loss[1] | | | |
| Step I | 21.39 (390) | 19.14 (400) | 11.6 (300) |
| Step II | — | — | — |
| Step III | — | — | — |

[1]The temperature at which the weight loss occurred is indicated between parentheses (° C.).

The sample with the asterisk is a comparative one.

The experimental results show that coating materials according to the present invention exhibit a reduced weight loss, i.e. lower than 10% at a temperature of or higher than 300° C., with respect to the comparative material having an aromatic acrylate.

A reduced weight loss under heating is indicative of thermal stability. In Table 2a, the comparative sample 1* lost 3% of weight at 220° C., but the next weight loss at 300° C. is of 24%, the total weight loss of the sample being of 27% at 300° C. The polymeric materials according to the invention showed a remarkable thermal stability (in term of weight loss below 10%) at a temperature of 300° C. and even higher. For example, sample 3 had no weight loss up to 320° C. (when a weight loss of 18.5% occurred), while sample 4 had a negligible weight loss (3.9%) at 290° C. and remained stable up to 380° C. (when a weight loss of 21.6% occurred, the total weight loss of the sample being of 25.5% at 380° C.).

In Table 2b, the comparative sample 8* is a commercially available acrylate material for buffer coating (Bufferlite™ DU-2008 by DSM). Sample 8* had a weight loss of 11.6% at 300° C., while samples 6 and 7 according to the invention had a weight loss at temperature higher than 350° C. only.

Crystalline Evaluation

The X-ray scattering patterns of selected samples of the cured polymer material were recorded on a X-Pert PRO PANalytical diffractometer using a Cu Kα radiation (λ=1.5418 Å, 2θ=5-80). The collected XRD data were used to calculate the degree of cristallinity (FWHM of the main peak having a maximum at about 2θ=18-20).

The degree of cristallinity of sample 5 was also measured after thermal aging of the material at 180° C. and 210° C. The degree of cristallinity for the measured samples is listed in Table 3.

TABLE 3

| Degree of cristallinity (FWHM) | Sample | | |
|---|---|---|---|
| | 4 | 5 | 1* |
| At 25° C. | 9.3 | 11.4 | 13.6 |
| After aging 43 hours at 180° C. | 10.6 | — | — |
| After aging 20 hours at 210° C. | 11.0 | — | — |
| After aging 19 hours at 210° C. | 10.3 | — | — |

The high temperature resistance observed appears to be correlated with the higher degree of crystallinity of the polymer materials according to the present invention as indicated by the lower FWHM values (higher crystallite size) compared to the FWHM value of the comparative sample. Moreover the degree of cristallinity of the polymer materials of the present invention does not vary substantially upon thermal aging of the material at 180-210° C.

The disclosure can be further appreciated through the below alternative or additional embodiments. For example, embodiments of the present disclosure include a polymerizable composition comprising: (A) a radiation-curable urethane (meth)acrylate oligomer obtained by reacting a cycloaliphatic polyisocyanate, a $C_{40}$-$C_{180}$ polyoxyalkylene ether glycol and a hydroxyl-containing (meth)acrylate monomer; (B) at least one reactive diacrylate monomer; and (C) at least one photoinitiator.

For another example, the $C_{40}$-$C_{180}$ polyoxyalkylene ether glycol is a $C_{40}$-$C_{64}$ polyoxyalkylene ether glycol of general formula (Ia):

$$HO[[-CH_2]_nO-]_mH \quad (Ia)$$

wherein:

n is an integer selected from 2 to 6;

m is an integer selected from 7 to 32;

with the proviso that n multiplied by m is a value of from 40 to 64.

For a further example, the $C_{40}$-$C_{180}$ polyoxyalkylene ether glycol is a $C_{80}$-$C_{180}$ polyoxyalkylene ether glycol of general formula (Ib)

$$HO[[-CH_2]_nO-]_mH \quad (Ib)$$

wherein:

n is an integer selected from 2 to 6;

m is an integer selected from 20 to 45;

with the proviso that n multiplied by m is a value of from 80 to 180.

For a further example, the hydroxy-containing (meth)acrylate monomer is selected from: hydroxyalkyl(meth)acrylate monomer, hydroxyaryl(meth)acrylate monomer, hydroxycycloalkyl(meth)acrylate monomer and mixture thereof.

For another example, the cycloaliphatic polyisocianate is selected from: methylenebis(4-ciclohexyl)isocyanate, isophoronediisocyanate and mixture thereof. In embodiments, For a further example, embodiments of the present disclosure include a method, comprising: forming a first coating surrounding an optical waveguide, the optical waveguide including a core surrounded by a cladding; and forming a second coating surrounding the first coating, the second coating including a polyurethane acrylate polymer and having a degree of crystallinity of at most 12, the forming the second coating including: applying a polymerizable composition including a urethane (meth)acrylate compound on a surface of the first coating; and radiation curing the polymerizable composition.

For another example, the method further comprises producing the polymerizable composition by mixing: (A) the urethane (meth)acrylate compound, which is a radiation-curable urethane (meth)acrylate oligomer; (B) at least one reactive diacrylate monomer; and (C) at least one photoinitiator.

For another example, the method further comprises producing the radiation-curable urethane (meth)acrylate oligomer by reacting a cycloaliphatic polyisocyanate, a $C_{40}$-$C_{180}$ polyoxyalkylene ether glycol, and a hydroxyl-containing (meth)acrylate monomer.

For a further example, the radiation-curable urethane (meth)acrylate oligomer (A) is present in the polymerizable composition in an amount of from 20 wt % to 90 wt %; the at least one reactive diacrylate monomer (B) is present in the polymerizable composition in an amount of from 20 wt % to 80 wt %; and the at least one photoinitiator (C) is present in the polymerizable composition in an amount of from 0.3 wt % to 8 wt %.

The invention claimed is:

1. An optical fibre comprising:

an optical waveguide comprising a core surrounded by a cladding;

a primary coating surrounding the optical waveguide; and a coating, surrounding the primary coating, comprising a polymer material obtained by radiation curing a polymerizable composition comprising a urethane acrylate oligomer, wherein the urethane acrylate oligomer is free of ester groups bound to a main chain of the urethane acrylate oligomer, the polymer material having an order degree of at least 4 2Θ and at most 12 2Θ, wherein the order degree is expressed as a full width at half maximum (FWHM) of a main intensity peak plotted against 2 theta (2Θ) diffraction angles of an X-ray scattering pattern having a maximum within the range 10-30 2Θ.

2. An optical fibre according to claim 1, wherein the coating surrounding the primary coating is a secondary coating, a buffer coating or both.

3. An optical fibre according to claim 2, wherein the coating surrounding the primary coating is a secondary coating made of a polymerizable composition comprising:

(A) a radiation-curable urethane (meth)acrylate oligomer obtained by reacting an aliphatic polyisocyanate, a $C_{40}$-$C_{64}$ polyoxyalkylene ether glycol and a hydroxyl-containing (meth)acrylate monomer;

(B) at least one reactive diacrylate monomer; and (C) at least one photoinitiator.

4. An optical fibre according to claim 2, wherein the coating surrounding the primary coating is a buffer coating made of a polymerizable composition comprising:

(A) a radiation-curable urethane (meth)acrylate oligomer obtained by reacting an aliphatic polyisocyanate, a $C_{80}$-$C_{180}$ polyoxyalkylene ether glycol and a hydroxyl-containing (meth)acrylate monomer;

(B) at least one reactive diacrylate monomer; and (C) at least one photoinitiator.

5. An optical fibre according to claim 3, wherein the aliphatic polyisocyanate is a cycloaliphatic polyisocianate.

6. An optical fibre according to claim 5, wherein the cycloaliphatic polyisocianate is selected from: methylenebis(4-ciclohexyl)isocyanate, isophoronediisocyanate and mixture thereof.

7. An optical fibre according to claim 3, wherein the $C_{40}$-$C_{64}$ polyoxyalkylene ether glycol is a compound of general formula (Ia)

$$HO[[-CH_2]_nO-]_mH \qquad (Ia)$$

wherein:
n is an integer selected from 2 to 6;
m is an integer selected from 7 to 32;
with the proviso that n multiplied by m is a value of from 40 to 64.

8. An optical fibre according to claim 7, wherein the $C_{40}$-$C_{64}$ polyoxyalkylene ether glycol is a compound of general formula (Ia) wherein n=4 and m is from 10 to 16.

9. An optical fibre according to claim 7, wherein the $C_{40}$-$C_{64}$ polyoxyalkylene ether glycol has a number average molecular weight equal to or greater than 650.

10. An optical fibre according to claim 4, wherein the $C_{80}$-$C_{180}$ polyoxyalkylene ether glycol is a compound of general formula (Ib)

$$HO[[-CH_2]_nO-]_mH \qquad (Ib)$$

wherein:
n is an integer selected from 2 to 6;
m is an integer selected from 20 to 45;
with the proviso that n multiplied by m is a value of from 80 to 180.

11. An optical fibre according to claim 10, wherein the $C_{80}$-$C_{180}$ polyoxyalkylene ether glycol is a compound of general formula (Ib) wherein n=4 and m is from 25 to 45.

12. An optical fibre according to claim 10, wherein the $C_{80}$-$C_{180}$ polyoxyalkylene ether glycol has a number average molecular weight equal to or greater than 1,400.

13. An optical fibre according to claim 3, wherein the hydroxyl-containing (meth)acrylate monomer is selected from: hydroxyalkyl(meth)acrylate monomer, hydroxyaryl (meth)acrylate monomer, hydroxycycloalkyl(meth)acrylate monomer and mixture thereof.

14. An optical fibre according to claim 3, wherein the radiation-curable urethane (meth)acrylate oligomer has a number average molecular weight from 1,200 to 2,000.

15. An optical fibre according to claim 4, wherein the radiation-curable urethane (meth)acrylate oligomer has a number average molecular weight from 2,000 to 5,500.

16. An optical fibre according to claim 4, wherein the aliphatic polyisocyanate is a cycloaliphatic polyisocianate.

17. An optical fibre according to claim 16, wherein the cycloaliphatic polyisocianate is selected from: methylenebis (4-ciclohexyl)isocyanate, isophoronediisocyanate and mixture thereof.

18. An optical fibre according to claim 7, wherein the $C_{40}$-$C_{64}$ polyoxyalkylene ether glycol has a number average molecular weight of up to 1,300.

19. An optical fibre according to claim 12, wherein the $C_{80}$-$C_{180}$ polyoxyalkylene ether glycol has a number average molecular weight of up to 3,400.

20. An optical fibre according to claim 4, wherein the hydroxyl-containing (meth)acrylate monomer is selected from: hydroxyalkyl(meth)acrylate monomer, hydroxyaryl (meth)acrylate monomer, hydroxycycloalkyl(meth)acrylate monomer and mixture thereof.

* * * * *